(12) United States Patent
Ishigame

(10) Patent No.: US 11,868,035 B2
(45) Date of Patent: Jan. 9, 2024

(54) PROJECTION OPTICAL SYSTEM AND IMAGE DISPLAY DEVICE WITH REFRACTIVE OPTICAL SYSTEM TO FORM AN IMAGE ON A RECEIVING SURFACE

(71) Applicant: RICOH INDUSTRIAL SOLUTIONS INC., Yokohama (JP)

(72) Inventor: Takayuki Ishigame, Yokohama (JP)

(73) Assignee: RICOH INDUSTRIAL SOLUTIONS INC., Yokohama (JP)

( * ) Notice: Subject to any disclaimer, the term of this patent is extended or adjusted under 35 U.S.C. 154(b) by 742 days.

(21) Appl. No.: 16/966,674

(22) PCT Filed: Jan. 29, 2019

(86) PCT No.: PCT/JP2019/002973
§ 371 (c)(1),
(2) Date: Jul. 31, 2020

(87) PCT Pub. No.: WO2019/151252
PCT Pub. Date: Aug. 8, 2019

(65) Prior Publication Data
US 2021/0033829 A1  Feb. 4, 2021

(30) Foreign Application Priority Data
Feb. 1, 2018 (JP) ................. 2018-016540

(51) Int. Cl.
*G03B 21/28* (2006.01)
*G02B 17/08* (2006.01)
(Continued)

(52) U.S. Cl.
CPC ............. *G03B 21/28* (2013.01); *G02B 17/08* (2013.01); *G02B 13/16* (2013.01); *G02B 13/18* (2013.01)

(58) Field of Classification Search
CPC ..... G03B 21/28; G02B 17/08; G02B 17/0856; G02B 17/086
See application file for complete search history.

(56) References Cited

U.S. PATENT DOCUMENTS 6,222,676 B1 * 4/2001 Togino ............... G02B 27/0172
                                                         359/676
6,278,556 B1 * 8/2001 Togino ................. G02B 17/086
                                                         359/627
(Continued)

FOREIGN PATENT DOCUMENTS

CN      104570288 A    4/2015
JP      2002-118058 A  4/2002
(Continued)

OTHER PUBLICATIONS

International Search Report dated May 7, 2019 in PCT/JP2019/002973 filed on Jan. 29, 2019, 2 pages.

*Primary Examiner* — Bao-Luan Q Le
(74) *Attorney, Agent, or Firm* — XSENSUS LLP

(57) ABSTRACT

The present invention aims to provide a projection optical system that projects an image displayed on an image display surface of an image display element in an enlarged manner on a projection receiving surface as a projection image, the projection optical system comprising: a refractive optical system and a refractive/reflective optical element arranged in sequence from near the image display surface toward the projection receiving surface, wherein the refractive optical system includes a plurality of lenses, wherein the refractive/reflective optical element includes an optical element unit that includes a reflection surface member including a reflection surface, and a refractive medium portion that is in tight contact with the reflection surface, the refractive medium portion includes an incidence surface and an emergence surface, and the reflection surface is a curved surface having (Continued)

refractive power, and wherein an image-forming light beam emerging from the refractive optical system is caused to enter the refractive/reflective optical element from the incidence surface of the refractive medium portion, reflected by the reflection surface, caused to emerge from the emergence surface of the refractive medium portion, and formed into an image on the projection receiving surface as the enlarged image.

9 Claims, 6 Drawing Sheets

(51) Int. Cl.
*G02B 13/16* (2006.01)
*G02B 13/18* (2006.01)

(56) References Cited

U.S. PATENT DOCUMENTS

| | | | | |
|---|---|---|---|---|
| 7,274,522 | B2* | 9/2007 | Inamoto | G02B 17/086 359/834 |
| 7,986,467 | B2* | 7/2011 | Tamura | G02B 15/144113 359/686 |
| 10,025,092 | B1* | 7/2018 | Lin | G02B 13/16 |
| 10,788,651 | B2* | 9/2020 | Bae | G02B 13/02 |
| 2001/0038446 | A1 | 11/2001 | Takahashi | |
| 2002/0163742 | A1* | 11/2002 | Togino | G02B 17/02 359/837 |
| 2003/0002167 | A1* | 1/2003 | Hoshi | G02B 17/086 359/730 |
| 2004/0027544 | A1* | 2/2004 | Chatani | G02B 17/0663 348/E5.137 |
| 2004/0174611 | A1* | 9/2004 | Hatakeyama | G02B 17/0852 359/676 |
| 2004/0179273 | A1* | 9/2004 | Ishikawa | G02B 15/143507 359/680 |
| 2005/0078281 | A1* | 4/2005 | Hatakeyama | G03B 21/28 353/69 |
| 2005/0200974 | A1 | 9/2005 | Nishikawa et al. | |
| 2006/0114575 | A1 | 6/2006 | Togino | |
| 2008/0013191 | A1 | 1/2008 | Togino et al. | |
| 2008/0158523 | A1* | 7/2008 | Jackson | G03B 21/28 348/E5.142 |
| 2015/0160441 | A1 | 6/2015 | Lin | |
| 2015/0346469 | A1* | 12/2015 | Lin | G02B 13/16 353/121 |
| 2016/0116830 | A1* | 4/2016 | Lin | G02B 21/28 353/97 |

FOREIGN PATENT DOCUMENTS

| | | |
|---|---|---|
| JP | 2004-170877 A | 6/2004 |
| JP | 2005-292813 A | 10/2005 |
| JP | 2006-58354 A | 3/2006 |
| JP | 2007-328232 A | 12/2007 |
| JP | 5274030 B2 | 8/2013 |
| JP | 5632782 B2 | 11/2014 |
| JP | 2015-108797 A | 6/2015 |

\* cited by examiner

Fig. 3

| | S7 | S8 | S22 | S23 | S24 | S25 | S26 | S27 | S29 |
|---|---|---|---|---|---|---|---|---|---|
| RDY | 19.027 | -53.724 | 27.344 | 29.97 | 39.239 | 26.243 | -31.832 | 149.708 | -34.258 |
| K | -0.754257 | 7.182893 | 0 | 0 | -14.206378 | -0.383397 | 0.462793 | 30.593479 | -1.662506 |
| A | -5.440120E-06 | 1.891170E-05 | -3.104000E-05 | -3.354460E-05 | 4.019620E-05 | 1.436440E-05 | 3.880310E-05 | -2.069980E-05 | 2.880370E-06 |
| B | 2.118250E-08 | 2.196100E-08 | -5.561720E-08 | 3.945880E-08 | -8.831740E-08 | -1.173240E-07 | -1.849970E-08 | 6.880330E-08 | -6.412020E-09 |
| C | 2.041760E-10 | -1.184680E-10 | 2.478420E-10 | -3.904340E-10 | -1.388030E-11 | 2.481230E-10 | 3.305050E-11 | -1.950290E-10 | 1.025160E-11 |
| D | -1.822280E-12 | 4.554720E-13 | 6.235510E-14 | 5.064280E-14 | 8.623380E-14 | -4.721920E-14 | -6.622780E-14 | 3.087700E-13 | -5.283820E-15 |
| E | 9.301810E-15 | 3.059570E-15 | -1.242910E-15 | -1.761520E-15 | -1.503300E-15 | 3.585240E-16 | 9.172320E-18 | -2.148290E-18 | 0 |
| F | -1.393230E-17 | -1.321710E-17 | 1.238600E-18 | 1.550650E-18 | -3.093880E-20 | -1.324250E-20 | 6.751430E-20 | 8.100020E-21 | 0 |
| G | 0 | 0 | 0 | 0 | 0 | 0 | 0 | 0 | 0 |
| H | 0 | 0 | 0 | 0 | 0 | 0 | 0 | 0 | 0 |
| J | 0 | 0 | 0 | 0 | 0 | 0 | 0 | 0 | 0 |

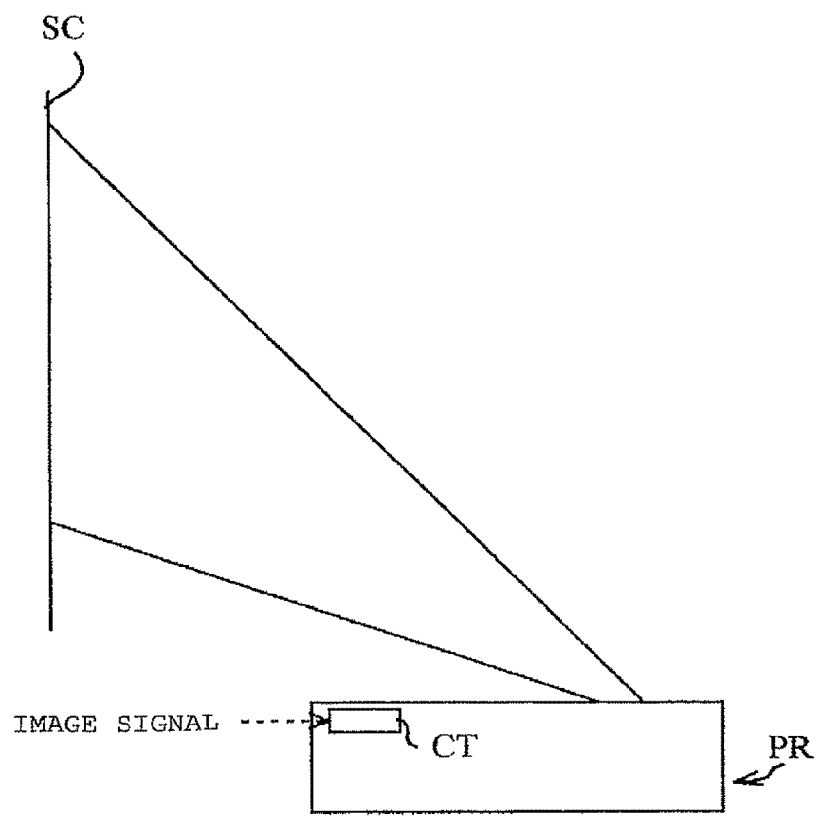

PROJECTION OPTICAL SYSTEM AND IMAGE DISPLAY DEVICE WITH REFRACTIVE OPTICAL SYSTEM TO FORM AN IMAGE ON A RECEIVING SURFACE

TECHNICAL FIELD

The present invention relates to a projection optical system and an image display device.

The image display device can be embodied as a projector. Thus, the image display device is referred to as "a projector", below.

BACKGROUND ART

Various types of image display devices known thus far display images on an image display surface of an image display element, and project the displayed image in an enlarged manner on a projection receiving surface (also referred to as a "screen", below) with a projection optical system as a projection image. In these days, projection optical systems formed from a combination of a refractive optical system (lens system) and a curved mirror are known (PTL 1 and PTL 2).

Hereinbelow, such "a projection optical system formed from a combination of a refractive optical system and a curved mirror" is referred to as "a refractive/reflective projection optical system", for convenience.

The refractive/reflective projection optical system generally reflects an image-forming light beam from an image display surface via a refractive optical system toward a screen so as to fold the image-forming light beam back with a curved mirror, and applies refractive power of the curved mirror to the light beam to form a projection image on the screen.

Thus, a side of the image display device on which the image display element and the refractive optical system are disposed can be directed toward the screen, so that the image display device can be placed closer to the screen, which enables a so-called "ultra short throw projector", which requires a short projection distance. Thus, various different types of refractive/reflective projection optical systems have been widely put to practical use.

SUMMARY OF INVENTION

Technical Problem

The present invention aims to provide a novel refractive/reflective projection optical system.

Solution to Problem

The present invention provides a projection optical system that projects an image displayed on an image display surface of an image display element in an enlarged manner on a projection receiving surface as a projection image, the projection optical system comprising: a refractive optical system and a refractive/reflective optical element arranged in sequence from near the image display surface toward the projection receiving surface, wherein the refractive optical system includes a plurality of lenses, wherein the refractive/reflective optical element includes an optical element unit that includes a reflection surface member including a reflection surface, and a refractive medium portion that is in tight contact with the reflection surface, the refractive medium portion includes an incidence surface and an emergence surface, and the reflection surface is a curved surface having refractive power, and wherein an image-forming light beam emerging from the refractive optical system is caused to enter the refractive/reflective optical element from the incidence surface of the refractive medium portion, reflected by the reflection surface, caused to emerge from the emergence surface of the refractive medium portion, and formed into an image on the projection receiving surface as the projection image.

Advantageous Effects of Invention

The present invention can embody a novel projection optical system.

BRIEF DESCRIPTION OF DRAWINGS

FIG. 3 is a graph showing aspherical surface data of an aspherical surface used for embodying a projection optical system.

FIG. 7 illustrates an image display device according to an embodiment.

DESCRIPTION OF EMBODIMENTS

Embodiments will be described, below.

Figure 1:
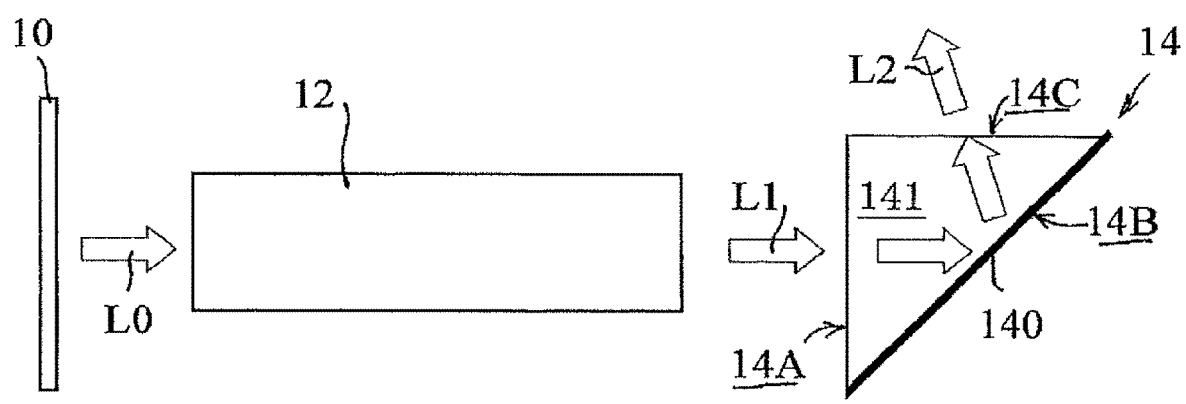
FIG. 1 schematically illustrates a projection optical system of the present invention.

FIG. 1 schematically illustrates a projection optical system of the present invention.

The projection optical system is an optical system that has a function of projecting an image displayed on an image display surface of an image display element in an enlarged manner on a projection receiving surface of a screen or other device as a projection image.

In FIG. 1, reference sign 10 denotes an image display element, reference sign 12 denotes a refractive optical system, and reference sign 14 denotes a refractive/reflective optical element.

Examples usable as appropriate as the image display element 10 known thus far include a liquid crystal panel, a digital micromirror device (DMD), or a light emitting device array, formed by two-dimensionally arraying microscopic light emitting devices such as a LD. A surface of these image display elements that displays images to be projected by a projection optical system in an enlarged manner is an "image display surface".

When the image display element 10 has no "light emitting function that a light emitting device array has" (as in the case of, for example, a liquid crystal panel or DMD), an image displayed on the image display surface is irradiated with lighting means.

The projection optical system includes the refractive optical system 12 and the refractive/reflective optical element 14. The refractive optical system 12 and the refractive/reflective optical element 14 are arranged along an optical path from the side of the image display surface (right surface of the image display element 10 in FIG. 1) toward the side of a projection receiving surface, not illustrated.

The refractive optical system 12 includes multiple lenses. At least two of the multiple lenses constituting the refractive optical system 12 may be cemented together.

The refractive/reflective optical element 14 includes a reflection surface member 140 and a refractive medium portion 141. The reflection surface member 140 includes a reflection surface 14B. The refractive medium portion 141 is disposed in tight contact with the reflection surface 14B. The reflection surface member 140 and the refractive medium portion 141 are integrally formed as "an optical element unit".

The refractive medium portion 141 is formed from an optical material such as glass or plastics, and includes an incidence surface 14A and an emergence surface 14C.

As illustrated in FIG. 1, light L0 from the image display surface of the image display element 10 is incident on the refractive optical system 12 of the projection optical system, is transmitted through multiple lenses constituting the refractive optical system 12, receives refraction effect from each lens, and emerges from the refractive optical system 12 in the form of an image-forming light beam L1.

The image-forming light beam L1 emerging from the refractive optical system 12 enters the refractive medium portion 141 from the incidence surface 14A of the refractive medium portion 141 of the refractive/reflective optical element 14, is reflected by the reflection surface 14B, emerges from the emergence surface 14C in the form of a projection light beam L2, and is projected on the projection receiving surface in an enlarged manner as a projection image.

As described above, the refractive/reflective optical element 14 includes the incidence surface 14A, the emergence surface 14C, and the reflection surface 14B. The reflection surface 14B is a surface of the reflection surface member 140. The reflection surface member 140 may be, for example, a "reflection film", formed by being directly vapor-deposited on the refractive medium portion 141.

Alternatively, the reflection surface member 140 may be a metal member having a surface formed by "a metal having high surface reflectance", such as aluminium or silver, into a reflection surface.

Alternatively, the reflection surface member 140 may be formed from a glass or resin member having a reflection surface on which a reflection film is disposed.

In FIG. 1, for convenience of illustration, the refractive/reflective optical element 14 is drawn in "a flat shape", as well as the incidence surface 14A, the reflection surface 14B, and the emergence surface 14C. Actually, the reflection surface 14B among the incidence surface 14A, the reflection surface 14B, and the emergence surface 14C is a "curved surface having refractive power", which applies refractive power to the image-forming light beam L1.

Specifically, the projection optical system illustrated in FIG. 1 is a projection optical system that projects an image displayed on the image display surface of the image display element 10 onto a projection receiving surface, not illustrated, as a projection image in an enlarged manner. The refractive optical system 12 and the refractive/reflective optical element 14 are arranged in sequence from the side of the image display surface toward the side of the projection receiving surface. The refractive optical system 12 includes multiple lenses. The refractive/reflective optical element 14 is an optical element unit including the reflection surface member 140 that includes the reflection surface 14B, and the refractive medium portion 141 that is in tight contact with the reflection surface. The refractive medium portion 141 includes the incidence surface 14A and the emergence surface 14C. The reflection surface 14B is a curved surface having refractive power. The image-forming light beam L1 emerging from the refractive optical system 12 is caused to enter the refractive/reflective optical element 14 from the incidence surface 14A of the refractive medium portion 141, is reflected by the reflection surface 14B, emerges from the emergence surface 14C of the refractive medium portion 141, and is formed into an enlarged image on the projection receiving surface.

As described above, among the incidence surface 14A, the reflection surface 14B, and the emergence surface 14C of the refractive/reflective optical element 14, the reflection surface 14B is a "curved surface having refractive power". At least one of the incidence surface 14A and the emergence surface 14C may have refractive power. At least one of the incidence surface 14A and the emergence surface 14C having refractive power is a convex surface (having positive refractive power) or a concave surface (having negative refractive power).

The curve of the surface having refractive power may be spherical, such as convex spherical or concave spherical, aspherical, anamorphic, such as a cylinder surface, or in a free form.

One of the incidence surface 14A and the emergence surface 14C may have positive refractive power, and the other may have negative refractive power. Alternatively, both of the incidence surface 14A and the emergence surface 14C may have positive refractive power (may be convex surfaces). All of the incidence surface 14A, the reflection surface 14B, and the emergence surface 14C may have positive refractive power. In this case, the reflection surface 14B is a concave reflection surface.

The image display surface of the image display element 10 and the projection image enlarged and projected on the projection receiving surface have a conjugate relationship with respect to the projection optical system. This conjugate relationship may be a simple conjugate relationship. Alternatively, a light beam entering the refractive optical system 12 may form at least one "intermediate image" of the image displayed on the image display surface between the refractive optical system 12 and the emergence surface 14C of the refractive/reflective optical element 14. The intermediate image may be formed inside the refractive optical system 12, between the refractive optical system 12 and the refractive/reflective optical element 14, or in the refractive medium portion 141 of the refractive/reflective optical element 14.

When the intermediate image is formed between the refractive optical system 12 and the refractive/reflective optical element 14, this intermediate image is used as an object, and the projection image is formed on the projection receiving surface with the effect of refractive power of the incidence surface 14A, the reflection surface 14B, and the emergence surface 14C of the refractive/reflective optical element 14. In this case, "resultant refractive power" from the incidence surface 14A, the emergence surface 14C, and the reflection surface 14B has to be "positive".

Examples of a case where the intermediate image is formed in the refractive medium portion 141 of the refractive/reflective optical element 14 include a case where the intermediate image is formed with an optical effect of the refractive optical system 12 and the incidence surface 14A (first case), a case where the intermediate image is formed with the effect of the refractive optical system 12, the incidence surface 14A, and the reflection surface 14B (second case), and a case where using, as an object, the intermediate image formed with the optical effect of the refractive optical system 12 and the incidence surface 14A in the first case, another intermediate image formed by the reflection surface 14B is formed in the refractive medium portion 141 (third case).

In the first case, the projection image is formed with resultant positive refractive power from the reflection surface 14B and the emergence surface 14C, and the emergence surface 14C may have either positive or negative refractive power. In the second and third cases, the projection image is formed with refractive power of the emergence surface 14C, so that the emergence surface 14C has to have positive refractive power.

As described above, the refractive medium portion 141 of the refractive/reflective optical element 14 includes the incidence surface 14A and the emergence surface 14C. The incidence surface 14A and the emergence surface 14C do not have to be different optical surfaces. The incidence surface 14A and the emergence surface 14C may be an identical surface.

Specifically, a refractive/reflective optical element may have the incidence surface and the emergence surface formed from an identical surface.

The reflection surface 14B has a function of reflecting an image-forming light beam and deflecting the direction of the image-forming light beam toward the projection receiving surface. To implement this function, the center normal line to the reflection surface may be inclined with respect to the center normal line of the incidence surface and the emergence surface, which are formed from an identical surface.

Instead of inclining the center normal line, the rotation axes of the incidence-emergence surface and the reflection surface may serve as optical axes. In this case, an "oblique light beam" may be used as the image-forming light beam. Thus, an image-forming light beam reflected by the reflection surface has an angle with respect to the image-forming light beam incident on the reflection surface, so that the image-forming light beam reflected by the reflection surface can be directed toward the projection receiving surface.

One of preferable cases is where the incidence surface and the emergence surface, which is identical to the incidence surface, form a convex spherical surface, and the reflection surface is an aspherical surface rotationally symmetric with respect to the optical axis.

Figure 2:
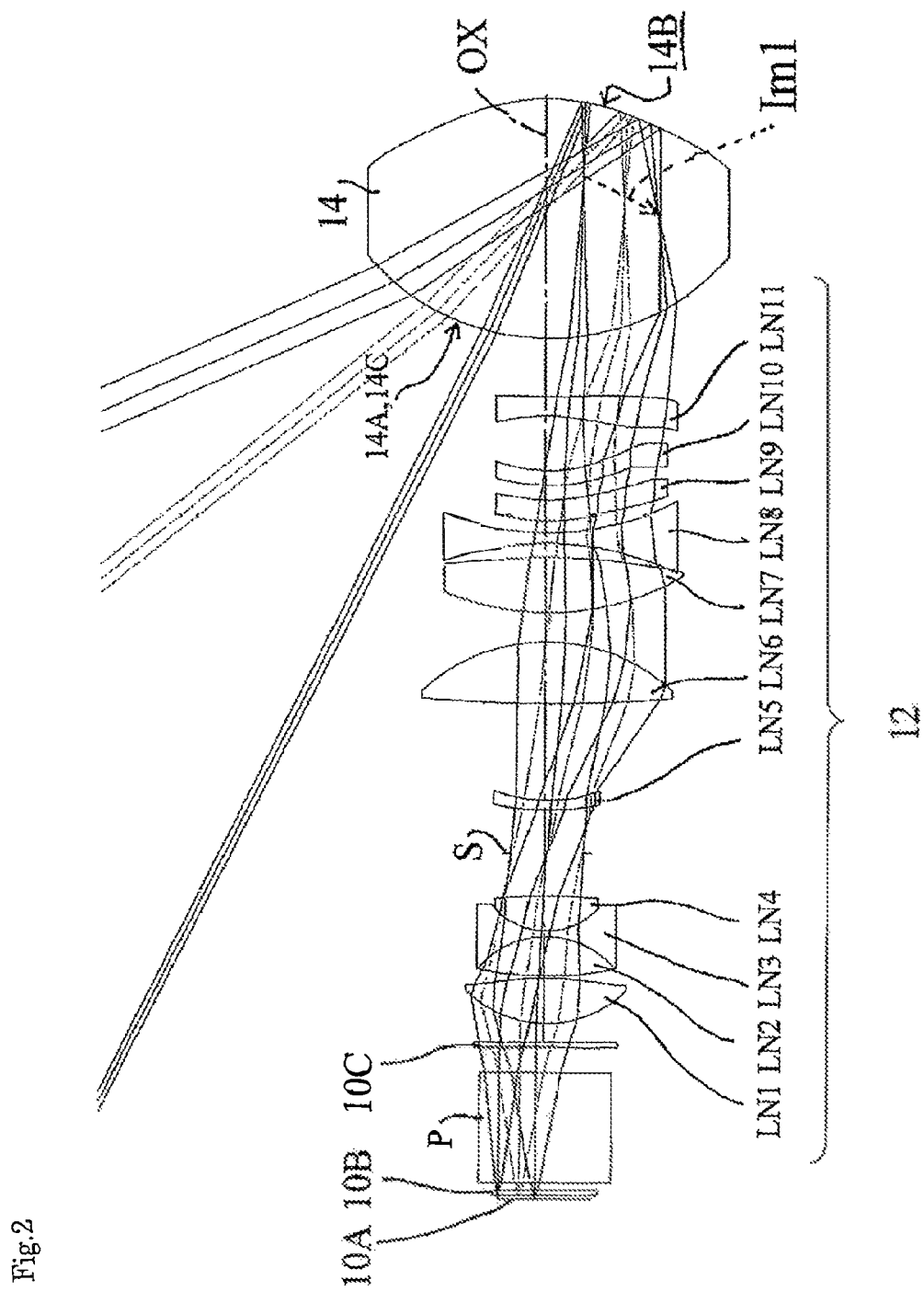
FIG. 2 is a cross-sectional view of a projection optical system according to an embodiment.

FIG. 2 illustrates a projection optical system according to "an embodiment". To avoid complex description, components unlikely to be mixed up are denoted with the same reference signs as those in FIG. 1.

In FIG. 2, reference sign 10A denotes an image display surface of the image display element.

A projection optical system illustrated in FIG. 2 is a color projector that projects color images in an enlarged manner. Examples of an image display element are three liquid crystal panels that respectively display red, green, and blue image components. The image display surface 10A provides the image display surfaces of these three liquid crystal panels in the form of an integrated image. Reference sign 10B denotes an integrated set of cover glasses of the liquid crystal panels, and reference sign P denotes a "color mixing prism". Reference sign 10C denotes a cover glass of the color mixing prism P on the emerging side. The color mixing prism P is common to the three liquid crystal panels.

The projection optical system includes the refractive optical system 12 and the refractive/reflective optical element 14. The refractive optical system 12 is disposed closer to the image display surface 10A, and the refractive/reflective optical element 14 is disposed on the image side of the refractive optical system 12.

The refractive optical system 12 includes eleven lenses LN1 to LN11, sequentially arranged from an object side toward an image side. The three lenses LN2 to LN4 are cemented, and an aperture diaphragm S is disposed between the lens LN4 and the lens LN5.

On the image side of the aperture diaphragm S, seven lenses LN5 to LN11 are arranged.

The refractive/reflective optical element 14 has "a biconvex lens shape", the incidence surface 14A and the emergence surface 14C form "an identical lens surface", and the reflection surface 14B is formed from a reflection film vapor-deposited on a lens surface to serve as a "reflection surface member".

In this embodiment, an "oblique light beam" is used as an image-forming light beam. Specifically, as illustrated in the drawing, an image displayed on the image display surface 10A deviates "upward in the drawing" with respect to the optical axis OX of the projection optical system. The oblique light beam serving as an image-forming light beam forms, as an inverted image, an "intermediate image Im1 of the image displayed on the image display surface 10A" inside the refractive medium portion with the effect of "positive refractive power of the incidence surface 14A of the refractive/reflective optical element 14" and the refractive optical system 12.

The projection image is projected on a projection receiving surface, not illustrated, in an enlarged manner with the effect of positive refractive power of the reflection surface 14B and the emergence surface 14C using the intermediate image Im1 as an object.

Among the lenses LN5 to LN11 located on the image side of the aperture diaphragm S, the lenses LN9 to LN11 each have "an unused portion cut" not to "block" the image-forming light beam reflected by the reflection surface 14B and emerging from the emergence surface 14C of the refractive/reflective optical element 14.

The image-formation position of the intermediate image Im1 is likely to have a high temperature due to "light beam concentration". In the embodiment, the image-formation position of the intermediate image is located "inside the refractive medium portion". This structure thus prevents an accidental insertion of a hand into this portion to avoid burn of the hand.

Embodiment

FIG. 2 illustrates a specific example of a projection optical system according to an embodiment.

The projection optical system of this embodiment projects in an enlarged manner an image displayed on the image display surface of the image display element having a number of pixels of 1920×1080 and at a pitch of 5.4 μm on a screen having a 94.7-inch diagonal.

An object height in the formed image is 10 mm and a focal length is 4.28 mm. The numerical aperture NA is 0.2778, the optical system full length is 193.28 mm, and the image formation magnification is 201.6 magnifications. The projection distance is "−855 mm", and the projection magnification is "201.6 magnifications".

In the following optical system data, "Surface No." refers to the number counted from the reducing side (closer to the image display surface 10A) toward the enlarging side. The image display surface 10A is denoted with "S0", as an object surface, and the screen surface serving as a projection receiving surface is denoted with "Si".

"R" denotes the radius of curvature (or paraxial radius of curvature for aspherical surface) of each of the surfaces including the surface of the aperture diaphragm S and the color mixing prism P.

"D" denotes the inter-surface distance on the optical axis.

"Nd" and "Vd" respectively denote the index of refraction and the Abbe number of the d line of each lens material.

"Effective diameter" refers to an optical effective diameter of each surface. The unit of an amount having a lengthwise dimension is "mm", unless otherwise noted.

The surface appended with (*) in the column of radius of curvature R is an "aspherical surface".

The aspherical surface is represented with a known formula, below, where the aspherical surface amount is denoted with Z, the height from an optical axis is denoted with r, the conic constant is denoted with k, and second-order to 20-order even-number-order aspherical surface coefficients are denoted with A, B, . . . , G, H, and J.

$$Z=(1/R)r^2/[1+\sqrt{\{1-(1+k)(1/R)^2r^2\}}]+A\cdot r^4+B\cdot r^6+\ldots+G\cdot r^{16}+H\cdot r^{18}+J\cdot r^{20}$$

Table 1 shows optical system data of the example.

TABLE 1

| Surface No. | R | D | Nd | vd | Effective Diameter |
|---|---|---|---|---|---|
| S0 |  | 0.703 |  |  | 20 |
| S1 |  | 1.1 | 1.50999 | 63.6 | 20.195 |
| S2 |  | 1.5 |  |  | 20.394 |
| S3 |  | 23 | 1.66672 | 48.3 | 20.809 |
| S4 |  | 5.3 |  |  | 24.59 |
| S5 |  | 1.1 | 1.52301 | 58.6 | 26.053 |
| S6 |  | 4 |  |  | 26.251 |
| S7 | 19.027 (*) | 9.42 | 1.58313 | 59.4 | 28.981 |
| S8 | −53.724 (*) | 0.5 |  |  | 27.856 |
| S9 | 59.271 | 8.24 | 1.72 | 43.7 | 24.6 |
| S10 | −16.232 | 1.2 | 1.80611 | 40.7 | 23.027 |
| S11 | 12.692 | 7.25 | 1.59349 | 67 | 17.975 |
| S12 | −102.122 | 9.02 |  |  | 17 |
| S13 |  | 9 |  |  | 14.236 |
| STO | 47.209 | 2 | 1.80518 | 25.5 | 18.18 |
| S15 | 26.358 | 20.30 |  |  | 18.717 |
| S16 | 250.657 | 12.95 | 1.59349 | 67 | 45.4 |
| S17 | −33.539 | 6.18 |  |  | 46.961 |
| S18 | 48.399 | 11.54 | 1.90366 | 31.3 | 47.16 |
| S19 | −111.367 | 2.83 |  |  | 45.609 |
| S20 | −54.339 | 2.2 | 1.90366 | 31.3 | 44.944 |
| S21 | 49.217 | 2.5 |  |  | 42.857 |
| S22 | 27.344 (*) | 4.42 | 1.509 | 56 | 44.383 |
| S23 | 29.97 (*) | 3.14 |  |  | 44.666 |
| S24 | 39.239 (*) | 3 | 1.509 | 56 | 44.885 |
| S25 | 26.243 (*) | 11.46 |  |  | 47.109 |
| S26 | −31.632 (*) | 3.93 | 1.509 | 56 | 48.156 |
| S27 | 149.708 (*) | 12.2 |  |  | 50.437 |
| S28 | 43.817 | 50 | 1.58313 | 59.4 | 52.378 |
| S29 | −34.258 (*) | −50 | 1.58313 | 59.4 | 44.088 |
| S30 | 43.817 | −855 |  |  | 69.341 |
| Si |  | 0 |  |  |  |

"Aspherical Surface Data"

FIG. 3 shows aspherical surface data in a "graph".

In the aspherical surface data, for example, "−1.392830E-17" denotes "−1.392830×10$^{-17}$".

As shown in "Table 1", an incidence surface (S28) and an emergence surface (S30) of a reflective/refractive optical element form an identical surface, which is "a convex spherical surface". A reflection surface (S29) is "an aspherical surface rotationally symmetric with respect to the optical axis".

Figure 4:
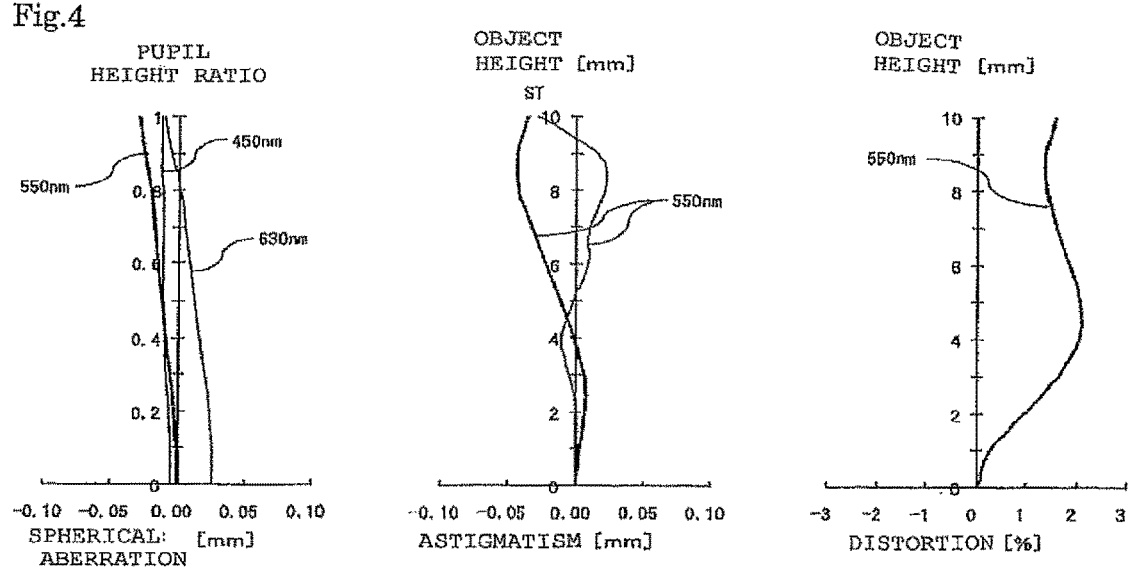
FIG. 4 shows the graphs of spherical aberration, astigmatism, and distortion of a projection optical system according to an example.
Figure 5:
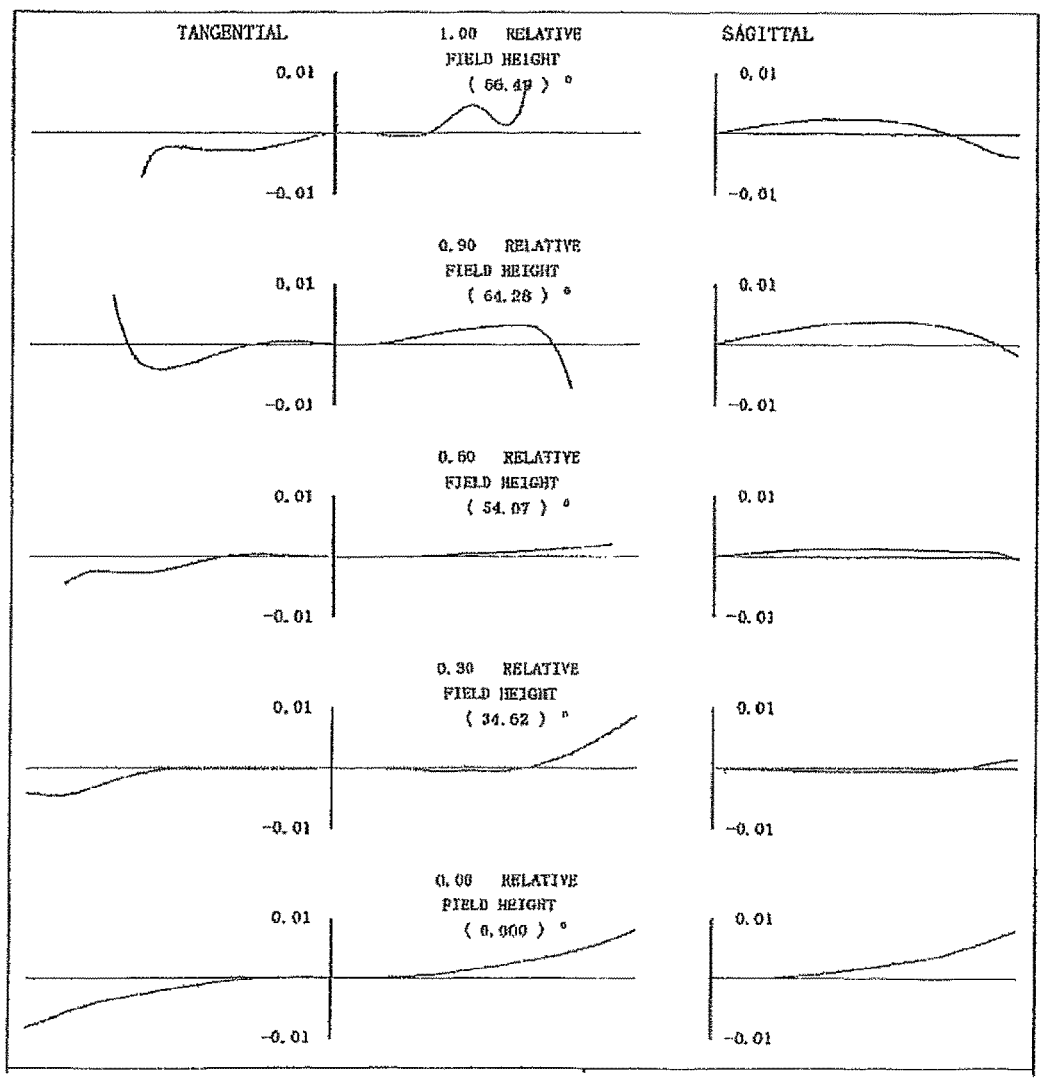
FIG. 5 shows the graphs of comatic aberration of a projection optical system according to an example.

FIGS. 4 and 5 are graphs of aberration according to the example.

FIG. 4 shows the graphs of spherical aberration, astigmatism, and distortion.

FIG. 5 shows the graphs of comatic aberration.

In the graphs of astigmatism, "bold lines" are provided for "meridional rays", and "thin lines" are provided for "sagittal rays". As is clear from FIGS. 4 and 5, aberration is preferably corrected, and the projection optical system of the example has high performance.

Figure 6:
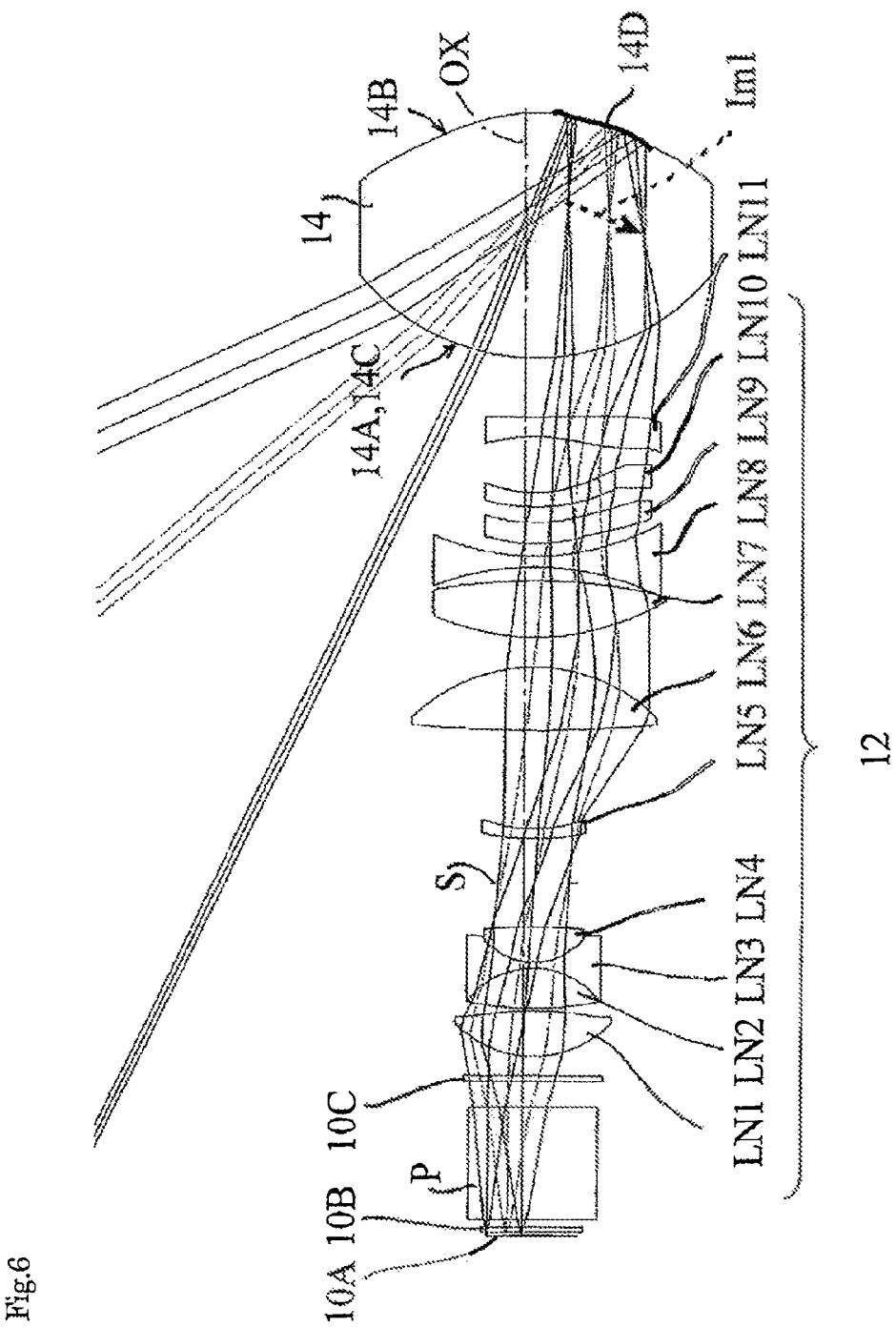
FIG. 6 illustrates a modification example of the projection optical system illustrated in FIG. 2.

FIG. 6 illustrates a modification example of the projection optical system according to an embodiment illustrated in FIG. 2. To avoid complex description, components unlikely to be mixed up are denoted with the same reference signs as those in FIG. 2.

The example illustrated in FIG. 6 differs from the example illustrated in FIG. 2 in that it "includes a radiating part 14D". The reflection surface member of the refractive/reflective optical element 14 is a "reflection film" formed by vapor deposition, and the refractive medium portion side of the refractive/reflective optical element 14 is a reflection surface. The reflection surface member possibly raises its temperature with irradiation with an image-forming light beam to be reflected.

Raising of the temperature of the reflection surface member may cause temperature rise and thermal expansion of refractive medium portion, which may change the optical characteristics of the refractive/reflective optical element 14. To avoid this, the radiating part 14D is disposed as illustrated in FIG. 6, to radiate heat of the reflection surface member and reduce heat storage in the reflection surface member.

"The radiating part" may have "a radiation structure", such as a radiating part fins included in the reflection surface member. Other conceivable structure examples include a structure where a heatsink made of a material having higher heat conductivity than the reflection surface member is joined to the reflection surface member, a structure where a heat conductive sheet is bonded to the reflection surface member, and a structure where a heat conductor such as metal is coated or applied to the reflection surface member.

FIG. 7 illustrates an image display device according to an embodiment.

A projector PR, serving as an image display device includes a projection optical system, like the one illustrated in FIG. 2 (not illustrated), and a controller CT in a casing. The controller CT controls "a lighting system and an image display element (not illustrated)". The image to be displayed is input to the controller CT as an image signal from an external device such as a computer. The controller CT controls the image display element according to the image signal to display an image to be projected to the image display surface. The image to be displayed is irradiated by the lighting system controlled by the controller CT, and projected by the projection optical system as an enlarged projection image on the screen SC, which is a to-be-scanned surface.

Examples usable as a projection optical system include those described in claims 1 to 9, specifically, embodiments.

Preferred embodiments of the present invention have been described thus far. However, the present invention is not limited to the above described specific embodiments. Unless otherwise specified in the above description, the embodiments may be modified or changed in various manners within the scope of the gist of the invention defined by the scope of claims.

For example, a refractive/reflective optical element is "an optical element unit", but "a unit" is a mere example of the form. Although a case where the refractive medium portion has a single structure has been described above, the structure of the refractive medium portion is not limited to this. For example, the refractive medium portion may have a complex structure including two or more different optical media, such as a cemented lens form. Forming the refractive medium portion from multiple optical media increases parameters for adjusting the performance of the projection optical system, which facilitates designing of the projection optical system.

Effects described in the embodiments of the present invention are mere examples of effects produced by the present invention. The effects of the present invention are not limited to "those described in the embodiments".

REFERENCE SIGNS LIST 10A image display surface
12 refractive optical system
14 refractive/reflective optical element
140 reflection surface member
14A incidence surface of refractive/reflective optical element 14
14B reflection surface of refractive/reflective optical element 14
14C emergence surface of refractive/reflective optical element 14
141 refractive medium portion
14D radiating part
LN1 to LN11 lens constituting refractive optical system
S aperture diaphragm
OX optical axis
Im1 intermediate image
P color mixing prism

CITATION LIST

Patent Literature

PTL 1: Japanese Patent No. 5274030
PTL 2: Japanese Patent No. 5632782

FIG. 4

1 PUPIL HEIGHT RATIO
2 SPHERICAL ABERRATION
3 OBJECT HEIGHT
4 ASTIGMATISM
5 OBJECT HEIGHT
6 DISTORTION

FIG. 7

7 IMAGE SIGNAL

The invention claimed is:

1. A projection optical system that projects an image, the projection optical system comprising: a refractive optical system and a refractive/reflective optical element arranged in sequence from an image display surface toward a projection receiving surface, wherein the refractive optical system includes a plurality of lenses, wherein the refractive/reflective optical element includes an optical element unit that includes a reflection surface member including a reflection surface, and a refractive medium portion that is in tight contact with the reflection surface, the refractive medium portion includes an incidence surface and an emergence surface, and the reflection surface is a curved surface having refractive power, wherein an image-forming light beam emerging from the refractive optical system is caused to enter the refractive/reflective optical element from the incidence surface of the refractive medium portion, reflected by the reflection surface, caused to emerge from the emergence surface of the refractive medium portion, and formed into an image on the projection receiving surface as a projection image, wherein one or more intermediate images of the image displayed on the image display surface are formed between the refractive optical system and the emergence surface of the refractive/reflective optical element, and wherein one or two of the one or more intermediate images are in the refractive medium portion of the refractive/reflective optical element.

2. The projection optical system according to claim 1, wherein at least one of the incidence surface and the emergence surface of the refractive medium portion has refractive power.

3. The projection optical system according to claim 2, wherein the incidence surface and the emergence surface have refractive power.

4. The projection optical system according to claim 3, wherein the incidence surface, the emergence surface, and the reflection surface have positive refractive power.

5. The projection optical system according to claim 1, wherein the incidence surface and the emergence surface of the refractive/reflective optical element are formed from an identical surface.

6. The projection optical system according to claim 5, wherein the incidence surface and the emergence surface identical to the incidence surface form a convex spherical surface, and the reflection surface is an aspherical surface rotationally symmetric with respect to an optical axis.

7. The projection optical system according to claim 1, wherein the reflection surface member of the refractive/reflective optical element includes a radiating part on a surface opposite to the reflection surface.

8. An image display device, comprising:
an image display element; and
a projection optical system that projects an image displayed on an image display surface of the image display element in an enlarged manner on a projection receiving surface as a projection image,
wherein the projection optical system corresponds to the projection optical system according to claim 1.

9. The image display device according to claim 8, wherein the image display surface deviates from an optical axis toward a direction orthogonal to the optical axis, and forms an oblique light beam serving as the image-forming light beam.

* * * * *